United States Patent
Illenberger et al.

(10) Patent No.: US 12,473,240 B2
(45) Date of Patent: Nov. 18, 2025

(54) BIOREACTOR AND USE THEREOF, METHOD FOR PRODUCING AN ORGANIC NUTRIENT SOLUTION AND FOR CARBON DIOXIDE STORAGE

(71) Applicant: Jassen-Kunststoffzentrum GmbH—Apparatebau, Zuschnitte und Formung, Steinen (DE)

(72) Inventors: Bernhard Illenberger, Steinen (DE); Hartmut Jassen, Steinen (DE)

(73) Assignee: Jassen-Kunststoffzentrum GmbH—Apparatebau, Zuschnitte und Formung, Steinen (DE)

( * ) Notice: Subject to any disclaimer, the term of this patent is extended or adjusted under 35 U.S.C. 154(b) by 1006 days.

(21) Appl. No.: 17/620,184

(22) PCT Filed: Jun. 15, 2020

(86) PCT No.: PCT/EP2020/066473
§ 371 (c)(1),
(2) Date: Dec. 17, 2021

(87) PCT Pub. No.: WO2020/254242
PCT Pub. Date: Dec. 24, 2020

(65) Prior Publication Data
US 2022/0363608 A1 Nov. 17, 2022

(30) Foreign Application Priority Data
Jun. 17, 2019 (DE) ................... 10 2019 116 410.9

(51) Int. Cl.
*C05F 17/20* (2020.01)
*B01J 23/34* (2006.01)
(Continued)

(52) U.S. Cl.
CPC ............... *C05F 17/20* (2020.01); *B01J 23/34* (2013.01); *C05F 17/15* (2020.01); *C05F 17/40* (2020.01);
(Continued)

(58) Field of Classification Search
CPC .......... C05F 17/20; C05F 17/15; C05F 17/40; C05F 17/989; B01J 23/34; C12M 23/36;
(Continued)

(56) References Cited

U.S. PATENT DOCUMENTS 3,779,906 A 12/1973 Levin
4,784,665 A 11/1988 Ona et al.
(Continued)

FOREIGN PATENT DOCUMENTS

CN 101164926 B 5/2010
CN 102206028 B 1/2013
(Continued)

OTHER PUBLICATIONS

Wikipedia. "UAN." Wikimedia Foundation, <https://web.archive.org/web/20160127023903/https://en.wikipedia.org/wiki/UAN> Jan. 27, 2016 (Year: 2016).*

*Primary Examiner* — Jennifer A Smith
(74) *Attorney, Agent, or Firm* — Volpe Koenig

(57) ABSTRACT

A bioreactor (1, 2, 3) and use thereof for converting organic residual and/or waste materials into an organic nutrient solution with a proportion of at least 10% plant-available mineralized nitrogen relative to the total nitrogen content of the nutrient solution. A process for preparing an organic nutrient solution is also provided, as well as an organic nutrient solution, use of an organic nutrient solution as an absorbent for carbon dioxide storage, use of an organic
(Continued)

nutrient solution as an agent for binding carbon in plants and soils and to a nutrient production and carbon dioxide storage system.

5 Claims, 4 Drawing Sheets

(51) Int. Cl.
    *C05F 17/10*     (2020.01)
    *C05F 17/40*     (2020.01)
    *C12M 1/00*     (2006.01)
    *C12M 1/107*     (2006.01)
    *C12M 1/12*     (2006.01)
    *C12N 1/20*     (2006.01)

(52) U.S. Cl.
    CPC ............ *C12M 23/36* (2013.01); *C12M 25/16* (2013.01); *C12M 29/04* (2013.01); *C12M 29/06* (2013.01); *C12M 43/08* (2013.01); *C12M 47/10* (2013.01); *C12N 1/20* (2013.01)

(58) Field of Classification Search
    CPC ...... C12M 25/16; C12M 29/04; C12M 29/06; C12M 43/08; C12M 47/10; C12M 25/02; C12M 29/02; C12M 47/00; C12N 1/20; C12P 3/00; Y02E 50/30; Y02W 30/40
    See application file for complete search history.

(56) References Cited

U.S. PATENT DOCUMENTS

| | | | |
|---|---|---|---|
| 11,672,214 B2* | 6/2023 | Illenberger | C12M 1/04 47/62 R |
| 2009/0282882 A1 | 11/2009 | Verhave et al. | |
| 2011/0126455 A1* | 6/2011 | Shinohara | C12N 1/14 435/243 |
| 2017/0327398 A1 | 11/2017 | Ido et al. | |
| 2020/0305370 A1* | 10/2020 | Illenberger | C05F 17/90 |

FOREIGN PATENT DOCUMENTS

| | | |
|---|---|---|
| CN | 103923821 B | 1/2016 |
| EP | 0486748 | 4/1991 |
| ES | 2298011 | 5/2008 |
| JP | 2012147682 A | 8/2012 |
| JP | 2017024973 A | 2/2017 |
| TW | 472783 U | 1/2002 |
| WO | 2010003255 | 1/2010 |
| WO | 2016050893 | 4/2016 |

* cited by examiner

Diagram 3

BIOREACTOR AND USE THEREOF, METHOD FOR PRODUCING AN ORGANIC NUTRIENT SOLUTION AND FOR CARBON DIOXIDE STORAGE

TECHNICAL FIELD

The invention relates to a bioreactor and the use thereof for converting organic residual and/or waste substances into an organic nutrient solution with a fraction of at least 10% of plant-available mineralized nitrogen, based on the total nitrogen content of the nutrient solution, having a reaction vessel, where the reaction vessel comprises a feed line, via which a suspension can be introduced into the reaction vessel, and where the reaction vessel comprises a drain line, via which the suspension can be discharged from the reaction vessel.

The invention relates further to a process for producing an organic nutrient solution with a fraction of at least 10% of plant-available nitrogen.

Further the invention relates to an organic nutrient solution. The organic nutrient solution may more particularly be an organic plant fertilizer.

The invention relates, moreover, to the use of an organic nutrient solution as an absorbent for storing $CO_X$ and/or $NO_X$ and/or $SO_X$, preferably from a combustion gas. It relates more particularly to the use of an organic nutrient solution as an absorbent for carbon dioxide storage, such as in a biogas plant and/or in a combined heat and power plant, for example.

Lastly the invention relates to a nutrient generation and carbon dioxide storage system.

BACKGROUND

Agriculture has always obtained nutrients for the agricultural production of plants from the utilization and recycling of residual and waste materials of plant and animal origin. The rule adopted by organic farming is that nitrogen, as an important plant nutrient, must be applied only in organic form as industrial/commercial fertilizer such as, for example, liquid manure, composts or horn meal. As a result of the expansion of the market for organic products, farms are becoming more specialized, and vegetable growers and other farms with no livestock are compelled to buy in and use organic commercial fertilizers, because of the selling and export of the biomass and the absence of industrial fertilizer. Particularly in the case of the greater demand for use of organic fertilizers, there is an appreciable fraction of nonmineralized nitrogen which cannot be taken up immediately by the plants.

The term "plant-available nitrogen", this being nitrogen which can be taken up directly by plants, is used fundamentally for inorganic nitrogen compounds. In contrast to these, organic nitrogen compounds cannot be taken up directly by plants. The term "plant-available nitrogen" refers in general to nitrogen present in the form of ammonium ($NH_4^+$) and nitrate ($NO_3$).

Hydroponic, soil-free or low-soil cultivation systems for plants currently utilize mineral fertilizer or mineral-organic fertilizer (fertilizer in which mineralized nitrogen compounds from industrial production are admixed to the organic material). Purely organic fertilizer material cannot be used, for two reasons. Firstly, the bacterial soil-plant interaction in such cultivation systems is extremely limited or absent in the case of soil-free systems. Additionally, mineralized nutrients in the soil that are immediately plant-available cannot be provided in sufficient quantity by a bacterial process that is dependent on external influences, such as nitrification. With organic fertilizers, furthermore, it is not possible to achieve a controlled, continual and immediate release of nitrogen which is required by the plant particularly in hydroponic planting systems.

A further factor regarded as posing a problem is that the conversion of organic fertilizer material, such as compost wastes and the like, and the associated release of mineralized nitrogen is dependent on a multiplicity of hard-to-control environmental factors such as soil humidity, soil temperature, and different concentrations of organic compounds in the soil. In the case of agricultural use, this lack of control leads to an absence of timely provision and to excesses/deficits in the nitrogen supply, and also to economically and environmentally hazardous counter-processes such as denitrification, for example.

Especially for soil-free (or low-soil) hydroponic/aeroponic cultivation systems, it is essential that the plants are supplied with an optimized nutrient solution, since the absent or reduced body of earth means that there is no substrate buffer function in relation to nutrient and water supply. With these systems it is not appropriate to utilize conventional, organic fertilizer material, because the nitrogen therein is unavailable or of insufficient availability to plants. With organic fertilizer material, furthermore, it is not possible to establish a defined and stable concentration of nutrient in the nutrient solution, owing to additional processes of breakdown/reorganization.

As well as the fundamental disadvantage of biological farming, which forgoes the use of mineral nitrogen fertilizer obtained industrially, which would be a key means of boosting yields, it is also seen as problematic that the demand for immediately plant-available nitrogen by crop plants, particularly in the final third of the growth phase, cannot be promptly covered by the use of existing organic industrial fertilizers and also organic fertilizers originating from residual and waste materials.

Since the beginning of industrialization, there has been a massive increase in the amount of carbon dioxide ($CO_2$) in the Earth's atmosphere, which by 2013 had already reached a fraction of 400 ppm. Alongside other gases exerting climatic activity, $CO_2$ contributes to global warming via the anthropogenic greenhouse effect. Around 18% of the global emissions come about through land use. It is regarded as a problem that in the anaerobic fermentation of organic wastes in biogas plants, for example, and in the burning of a biogas obtained using biogas plants, $CO_2$ is released.

It is also regarded as a problem that the primary source of plant nutrients for global agriculture is represented by chemical, mineral fertilizers produced industrially on the basis of the Haber-Bosch process, for example. Traditionally employed organic economic fertilizers lead to adverse environmental exposures, owing to their uncontrolled and uncontrollable mineralization and also their relatively low yield power in the soil, and are being used relatively less and less. As a result, however, there is a decreasing trend in the carbon supply that is necessary for soil fertility and for soil-bacterial interaction.

Additionally regarded as a problem is the fact that chemical, mineral fertilizers produced industrially on the basis of the Haber-Bosch process represent a substantial source of $CO_2$ emissions. The production of ammonia alone, for instance, requires 35.2 GJ of energy, corresponding to 840 kg of crude oil per metric ton of ammonia. For each kg of nitrogen (N), therefore, 2.2 kg of $CO_2$ are released.

Publication ES 2 298 011 A1 describes an aerobic fermentation process in a bioreactor which houses a mixture of cereal and yeast. At the bottom there are aeration pipes with filters, which introduce small air bubbles into the bioreactor.

Publication EP 0 486 748 A1 discloses a biofilm reactor for treating organically loaded wastewater. Introduced into the reactor are biofilm-carrier particles, on which bacteria particles can be adsorbed.

Document WO 2016050893 A1 discloses the use of biofilm carriers in anaerobic breakdown processes, where a biofilm is provided that is composed of methane-producing bacteria.

Laid-open specification U.S. Pat. No. 3,779,906 A describes a wastewater treatment process that involves cleaning the wastewater by treating it for several hours in an aerated chamber.

Publication WO 2010/003255 A1 discloses a device with which water can be enriched with oxygen. The oxygen-enriched water is then introduced into a plant culture.

SUMMARY

It is therefore an object of the invention to separate out the carbon dioxide (CO2) gas formed from the process of anaerobic fermentation of organic residual and waste materials and/or from the combustion of biogas, to scrub it out of the gas stream, and to stably absorb the $CO_2$.

The object is achieved in accordance with the invention by the use of one or more of the features disclosed herein.

For the purpose of achieving the object more particularly a bioreactor of the above-specified type is proposed, where the aeration device comprises a hydrogen peroxide reservoir and at least one catalyst by means of which hydrogen peroxide flowing out of the hydrogen peroxide reservoir during an aeration procedure can be converted or is converted into water and oxygen in a catalytic reaction. This has the advantage of enabling uniform oxygen supply within the reaction vessel. The liquid contained in the reaction vessel can therefore be enriched with oxygen to particularly good effect. Moreover, the catalytic conversion of oxygen from hydrogen peroxide is relatively inexpensive to acquire and maintain by comparison with other aeration devices.

According to one particularly advantageous embodiment, at least one catalyst may be disposed between the hydrogen peroxide reservoir and an outlet opening of the aeration device. In this way, the entry of hydrogen peroxide into the reaction vessel can be more effectively prevented, the hydrogen peroxide instead being converted into oxygen and water ahead of the outlet of the aeration device.

It may be particularly advantageous here if the at least one catalyst takes the form of manganese(IV) oxide and/or manganese oxide, more particularly manganese dioxide and/or manganite.

It may be particularly useful if the aeration device is designed in accordance with the apparatus from U.S. Pat. No. 4,784,665. The content of U.S. Pat. No. 4,784,665 is hereby incorporated by reference.

In order to achieve the object stated above, a further proposal is for a process for producing an organic nutrient solution with a fraction of at least 10%, more particularly at least 25%, preferably at least 50%, more preferably at least 75%, of plant-available, mineralized nitrogen, based on the total nitrogen content of the organic nutrient solution. Preferably in this case a nitrate fraction in the plant-available, mineralized nitrogen may be higher than an ammonium fraction. More preferably the bioreactor used is the bioreactor described and claimed herein.

The method comprises the steps of:

in a seeding step, seeding a carrier element, preferably a carrier element of the bioreactor as described and/or claimed herein, with a seed material which comprises ammonifying and/or nitrifying bacteria, forming a biofilm with ammonifying and/or nitrifying bacteria on the carrier element, in an incubating step, incubating an organic residual and/or waste material with the biofilm, more particularly in a reaction vessel, where the ammonifying and/or nitrifying bacteria convert organically bonded nitrogen in the residual and/or waste material into mineralized nitrogen, where during the implementation of individual or all the steps, oxygen is introduced into the reaction vessel and/or into the carrier element by means of an aeration device and where subsequently, in a carbon dioxide storage step, the organic nutrient solution produced by the preceding steps is treated with a carbon dioxide-containing gas, more particularly a biogas and/or a flue gas from a combined heat and power plant, and so gaseous carbon dioxide is bound by the organic nutrient solution. This step of carbon dioxide storage may preferably be performed in an externally sealed-off carbon dioxide storage space.

The process of the invention does not just enable production of an organic nutrient solution having a high fraction of plant-available, mineralized nitrogen. In addition, the organic nutrient solution is treated by carbon dioxide previously emitted to the atmosphere, and so this carbon dioxide is taken up by the nutrient solution and stored. The nutrient solution therefore contains a better carbon source for the plants fertilized thereby, for soil bacteria, and for the soil itself. Moreover, the escape of climatically harmful gas into the atmosphere is prevented, this gas being instead recirculated and bound.

In the organic nutrient solution, $CO_2$ absorption takes place at the cations, such as $NH_4$ and potassium. Additionally, when the solution is added to the soil, stable carbonates are formed on the alkaline earth metals present in the organic nutrient solution and in the soil, such as magnesium and calcium. Other alkaline minerals present in the ground water are neutralized by the bicarbonate $HCO_3$ formed in the course of absorption. In the organic nutrient solution formed, the plant nutrients are present in a mineralized, directly plant-available form and can be taken up by plants. Possessing this property, these fertilizers are comparable with the activity of mineral NPK fertilizer, and can be used as a substitute for it. Possessing the substitution capacity, the fertilizer has the property of active bonding of $CO_2$ emissions and of having prevented additional $CO_2$ emissions.

The nutrient solution can preferably be concentrated, by reduction of the water fraction, before carbon dioxide storage is carried out. This reduction can be accomplished, for example, by means of vacuum distillation. This enables even better $CO_2$ binding.

According to one development, a surface enlargement of the organic nutrient solution can be performed in the carbon dioxide storage step. This surface enlargement may be accomplished more particularly by passing the organic nutrient solution over a scrubber means. The scrubber means may comprise, for example, an apparatus or a combination of two or more apparatuses selected from bubble column reactor, tubular reactor, jet nozzle reactor, stirred tank, thin-film reactor and/or spraying tower. By means of the scrubber device it is therefore possible to enlarge the surface of the organic nutrient solution, which raises the efficiency of $CO_2$ binding by the organic nutrient solution.

For achieving the object stated above, an organic nutrient solution is further proposed which is produced by the above-described process and/or in the above-described bioreactor and which therefore comprises an additional carbon source. Here, more particularly, the organic nutrient solution may comprise a fraction of at least 10%, more particularly at least 25%, preferably at least 50%, more preferably at least 75%, of plant-available mineralized nitrogen, based on the total nitrogen content of the organic nutrient solution. With preference a nitrate fraction in the plant-available, mineralized nitrogen is higher than an ammonium fraction; more preferably in the organic nutrient solution there is an NO3:NH4+ ratio of at least 2:1, more particularly of at least 3:1, more particularly of at least 10:1, preferably of at least 25:1, more preferably of at least 50:1.

According to one possible development, the organic nutrient solution (also referred to as "soiling NRF") comprises an ammonium fraction ($NH_4^+$) of at least 10% of the total nitrogen content of the organic nutrient solution and/or a potassium fraction ($K^+$) of at least 10% of the total solids content of the organic nutrient solution and/or a calcium fraction ($Ca^{2+}$) of at least 5% of the total solids content of the organic nutrient solution and/or a magnesium fraction ($Mg^+$) of at least 1% of the total solids content of the organic nutrient solution and/or a protein fraction of at least 15% of the total solids content of the organic nutrient solution. In particular a pH of the organic nutrient solution may be not more than 7.5, preferably below 7.5, more preferably not more than 7.0, more preferably not more than 6.5, more preferably not more than 6.0. The absorption capacity of the nutrient solution is determined by the molar gas flow rate, the absorption efficiency of the gas/liquid reactor system, the volume and the flow rate of the absorbent. The pH of the nutrient solution can be regarded as an indicator of the $CO_2$ uptake. The carbonation of $NH_4^+$ ions, potassium ions, calcium ions and magnesium ions starts at a pH of >7.5 and lowers as $CO_2$ is taken up. For example, with the formation of ammonium bicarbonate ($NH_4HCO_3$), the OH concentration reduces, and so the pH falls. Uptake of $CO_2$ by the amine group raises the number of protons and lowers the pH.

| Cation composition and cation binding by the nutrient solution (soiling NRF) | | Reactions of the solution chemistry of cations-CO2—H2O systems of the soiling NRF |
|---|---|---|
| NH4+ | Fraction greater than 10% of the soluble total N in soiling NRF | (1) H2O < > H+ + OH− (2) CO2 + H2O < > H+ + HCO3− (3) HCO3− < > H+ + CO3 2− (4) NH3 + H2O < > NH4+ + OH− (5) NH3 + HCO3− < > NH2COO− + H2O (6) NH4+ + HCO3− < > NH4HCO3 |
| K+ | Fraction greater than 10% of the solids content in soiling NRF | (1) K2O + H2O < > 2 KOH (2) 2 KOH + CO2 < > K2CO3 + H2O (3) K2CO3 + H2O< > KHCO3 + KOH |
| Ca2+ | Fraction greater than 5% of the solids content in soiling NRF | (1) H2O < > H+ + OH− (2) Ca(OH)2 + CO2 < > CaCO2 + H2O |
| Mg+ | Fraction greater than 1% of the solids content in soiling NRF | (1)Mg + 2 H2O < > Mg(OH)2 + H2 (2) Mg(OH)2 + CO2 < > MgCO3 + 2 H2O |
| Amino groups | Fraction of the organic part (greater than 15% of the solids fraction) consisting of proteins with amino group cations in soiling NRF | (1) RNH2 + H+ < >RNH3+ (2) RNH2 + CO2< > RNHCOO− + H+ |

For achieving the object, furthermore, the use of an organic nutrient solution is proposed, as described and/or claimed and/or produced herein by a process and/or in a bioreactor as described and/or claimed herein, as an absorbent for storing $CO_X$ and/or $NO_X$ and/or $SO_X$. Provision may be made more particularly for its use as an absorbent for carbon dioxide storage, such as in a biogas plant and/or in a combined heat and power plant, for example, where the organic nutrient solution is treated with a $CO_X$- and/or $NO_X$- and/or $SO_X$-containing gas, such as carbon dioxide-containing gas, more particularly with a biogas and/or a flue gas from a combustion process, such as, for example, a flue gas from a combined heat and power plant or a flue gas from the combustion of fossil fuels, more particularly in an externally closed-off and/or sealed-off space. This has the advantage that the gaseous $CO_X$ and/or $NO_X$ and/or $SO_X$, more particularly carbon dioxide, is bound by the organic nutrient solution. It is therefore possible to replace what has to date been the most frequently employed amine scrub—based on amine compounds, such as monoethanolamine and diethanolamine—for the storage of carbon dioxide and other gases. As a result it is possible to provide a particularly eco-friendly alternative to the amine scrub.

For achieving the object, additionally, a nutrient generation and carbon dioxide storage system is proposed, comprising:
- a fermentation apparatus, more particularly a biogas plant, for generating an organic residual and/or waste material,
- optionally a combined heat and power plant for combustion of a biogas, generated by the fermentation apparatus, to obtain electrical energy and/or heat,
- a bioreactor, as described and/or claimed herein, for converting organic residual and/or waste materials into an organic nutrient solution, more particularly into a nutrient solution as described and/or claimed herein, and a carbon dioxide storage apparatus having a carbon dioxide storage space, preferably a carbon dioxide storage space which can be sealed off externally, in which at least one scrubber device is disposed, which is configured for implementing a liquid-gas reaction between a carbon dioxide-containing gas, more particularly a biogas and/or a flue gas from a combined heat and power plant, and the organic nutrient solution produced by the bioreactor. This has the advantage that a preferably closed gas circuit is formed, from which little or no carbon dioxide escapes, before the carbon dioxide storage step has been performed. Carbon dioxide formed as a waste product in fermentation and/or combustion process can be utilized by the nutrient generation and carbon dioxide storage system for the purpose of upgrading the nutrient solution, to provide an additional carbon source, more particularly a plant-available carbon source, for plants to be fertilized, for soil bacteria and for the soil itself. The fermentation apparatus and/or, if provided, the combined heat and power plant may preferably be configured to allow flue gases to be taken off via at least one gas conduit to the carbon dioxide storage apparatus. According to one preferred variant embodiment, the bioreactor may also serve as carbon dioxide storage apparatus. However, the carbon dioxide storage apparatus may also take the form of a unit independent of the bioreactor. There may preferably be at least one liquid conduit between the carbon dioxide storage apparatus and the bioreactor, to allow the organic nutrient solution to be transported further.

According to one advantageous possible embodiment, the carbon dioxide storage space is divided into at least two chambers, where a scrubber device is disposed in a first chamber and the second chamber is designed as a collecting chamber for the organic nutrient solution, and where the organic nutrient solution can be pumped by at least one pumping apparatus from the first chamber into the second chamber and/or from the second chamber into the first chamber. This enables particularly efficient binding of carbon dioxide by the nutrient solution.

Alternatively or additionally, the nutrient generation and carbon dioxide storage system may comprise a concentration apparatus by means of which it is possible to reduce a water fraction of the organic nutrient solution. The concentration apparatus may be configured, for example, for implementing a vacuum distillation.

More particularly, in the case of a bioreactor of the type described above, the bioreactor comprises an aeration device by means of which oxygen can be introduced into the reaction vessel and into the suspension contained therein, where at least one carrier element having a colonization surface for the formation of a biofilm of microorganisms is disposed in a receiving space of the reaction vessel, where the at least one carrier element may be subject to a flow of the introduced suspension and of the introduced oxygen around and/or through the carrier element, and where a surface-to-volume ratio of the carrier element is greater than a surface-to-volume ration of the receiving space. With the bioreactor it is possible accordingly to form a biofilm at a desired location on the colonization surface within a receiving space. On the colonization surface, therefore, ideal growth conditions can be generated for ammonifying and/or nitrifying bacteria. The bioreactor therefore enables more effective support of the desired conversion reactions of the microorganisms, so enabling the production of organic nutrient solutions having a larger fraction of plant-available nitrogen. It may be particularly preferable if the surface-to-volume ratio of the carrier element is designed to be at least eight times greater than the surface-to-volume ratio of the receiving space. The aeration unit may be configured, for example, to introduce the oxygen in the form of air.

According to one advantageous development, the at least one carrier element may be produced of a material or of a combination of two or more materials selected from the group consisting of plastic, more particularly of food-neutral plastic, of mineral, more particularly of zeolite, and/or of a rubber-plastic mixture. It may be particularly useful here if the plastic comprises polypropylene and/or polyethylene and/or rubber, since on these plastics the microorganisms can be colonized particularly effectively and form a biofilm. Moreover, it may be useful if the material in question is a polyethylene-rubber mixture. It is also conceivable for there to be a mineral-plastic mixture, more particularly a zeolite-plastic mixture.

It may also be particularly advantageous if the colonization surface of the carrier element is formed at least partly in pores and/or cavities. This has the advantage that the carrier element has an extremely large colonizable surface while the external dimensions of the carrier element are relatively small. The pores and/or the entrances to the cavities may preferably have a diameter of 10 µm to 100 µm, and so the pores and/or entrances permit penetration and/or ingress of liquid and gas and permit ingress and fixation of microorganisms. It may be particularly useful if the pores have an at least partly or very largely traversable design, meaning that the material more particularly has an open porosity. This allows particularly effective washing with suspension to be achieved.

Alternatively or additionally, according to a further advantageous embodiment, it is possible for the at least one carrier element to be designed such that it can be removed from the reaction vessel, more particularly removed without tools. The carrier element may be designed more particularly as a replaceable module. The advantage of this is that the carrier element can be removed from the reaction vessel quickly and simply, and replaced. It may further be particularly useful if the receiving space contains a guide device, by means of which the carrier element can be introduced, more particularly pushed or plugged, into the receiving space in a guided manner. A position of the carrier element within the receiving space may therefore be defined by the guide device.

In order to facilitate the introduction of oxygen into the reaction vessel and in order to avoid anaerobic reactions even more effectively, provision may be made for oxygen to be able to be introduced into the reaction vessel and/or into the at least one carrier element via a gas supply line, by means of the aeration device. Here it may be advantageous if the aeration device comprises at least one compressor or a gas connection, to allow better regulation of the introduction. The gas supply line may preferably be independent of the feed line and the drain line, allowing oxygen and suspension to be introduced independently of one another. The oxygen here may also be introduced in the form of air, for example. This has the advantage that ambient air, rather than pure oxygen in particular, is introduced, with ambient air being available in unlimited quantity.

Alternatively or additionally, the aeration device, more particularly an aeration device or the aeration device in the form of an aeration plate as already stated above, may be formed on a base of the reaction vessel, with a multiplicity of aeration openings. By means of the aeration device, more particularly, it may be possible to generate a uniform gas bubble density within the reaction vessel, preferably within the receiving space, to enable particularly uniform aeration within the reaction vessel. The aeration openings may preferably have equal diameters and/or be disposed at equal distances from one another. More preferably the aeration device may have a conical design, so making it possible more effectively to prevent the aeration openings becoming clogged by descending solid particles of the suspension.

In order to achieve particularly effective circulation of the suspension within the receiving space, the bioreactor may comprise a pumping apparatus. The pumping apparatus may be designed, for example, as a centrifugal pump or recirculation pump. It may also be advantageous if the pumping apparatus can be used to pump the suspension through the feed line into the reaction vessel and via the drain line from the reaction vessel. In order to be able to establish different flow rates through the reaction vessel and/or the feed and drain lines, a pumping output of the pumping apparatus may be able to be changed, i.e., more particularly, may be manually adjustable and/or programmable. By means of the pumping apparatus it may preferably be possible to generate, within the reaction vessel, a suspension flow direction which runs at least partly counter to and/or at least partly in an oxygen flow direction. This enables particularly effective mixing of the suspension with oxygen to be achieved. In order to be able to automate the implementation of a production process composed of multiple steps, by means of the bioreactor, the pumping apparatus may preferably be able to be programmed such that a pumping program with a plurality of substeps can be established automatically.

In order to provide ideal growth conditions and/or reaction conditions for the microorganisms, the bioreactor may have a heating apparatus, with which the receiving space of the reaction vessel and/or the suspension contained in the receiving space of the reaction vessel can be heated to an adjustable temperature. The temperature provided may more particularly be from 20° C. to 34° C., preferably from 22° C. to 32° C.

So that the carrier element can be removed easily from the bioreactor, it is possible, according to one advantageous development, for the reaction vessel to have an opening for filling the receiving space of the reaction vessel, and for the bioreactor to have a closure unit, which can be used to close the opening in the reaction vessel. The opening in the reaction vessel may be closable preferably, by means of the closure unit, in a manner which is impervious to fluid and/or resistant to pressure.

In order to prevent disruptive external influences on the conversion of the organic residual and/or waste material into the organic nutrient solution, a wall of the reaction vessel and a closure unit, or the closure unit already stated above, may be impervious to light. This allows the conversion rate to be improved.

It may also be useful if the colonization surface is hydrophobic.

In order to make it easier for the microorganisms to adhere on the colonization surface, the colonization surface may have a greater roughness than an inside of a reaction vessel wall.

In order to maximize the total colonization surface for the colonization of the microorganisms, the bioreactor may have a plurality of carrier elements. These carrier elements may preferably be disposed and/or designed in such a way as to be movable relative to one another. The carrier elements are preferably arranged loosely within the receiving space. As a result of circulation of the suspension, therefore, the carrier elements as well may likewise be circulated and/or moved by the resultant flow. In this way, gas exchange and suspension exchange on the carrier elements can be improved.

According to one particularly preferred development, the carrier elements provided may comprise a multiplicity of chips, more particularly a multiplicity of continuous plastic chips, with the chips possibly being arranged without order within the reaction vessel. The unordered arrangement may in particular give rise to entanglement of the chips. It is therefore possible for the colonization surfaces of the chips not to adhere to one another and/or not to be sufficiently amenable to a flow of oxygen around them, so preventing any unwanted denitrification processes from occurring. It may be particularly preferred for the chips to have a form, or a combination of two or more forms, selected from the group consisting of spiral and/or serpentine and/or undulating chips. Accordingly, the clinging or lying together of colonization surfaces of chips can be prevented to particularly good effect.

The chips may preferably each have a length of 2 cm to 10 cm and/or a width of 0.5 cm to 1.5 cm and/or a thickness of 50 µm to 500 µm.

Alternatively or additionally, at least one porous tube may be provided as a carrier element. The tube may more particularly be arranged transverse or parallel to a flow direction of the oxygen introduced into the reaction vessel, and/or transverse or parallel to a flow direction of the suspension introduced into the reaction vessel. This enables a particularly good flow around the tube.

According to one advantageous development, it is possible for oxygen to be able to be introduced through a tube or the aforementioned tube by way of a gas supply line. This gas supply line may be embodied more particularly as a bypass gas line, which is diverted from a main gas line, preferably a main gas line leading to a or the aforementioned aeration device. In this way, particularly effective supply of oxygen to the microorganisms colonizing at an inside of the tube wall is possible. The bioreactor preferably comprises a plurality of carrier elements in the form of tubes. It may additionally be the case that the tube is integrated into a line which runs within the receiving space. This line may be connected to the feed line and/or to the drain line. Preferably a shut-off valve may be inserted in the line, within the receiving space, upstream and/or downstream of the tube. It is therefore possible in a simple way to increase a tube internal pressure, by closing a shut-off valve arranged downstream of the tube in the flow direction, hence allowing the flow of the suspension to be conducted in at least a short time through the pores in the tube wall, or allowing suspension to be prevented from entering the tube, by closing a shut-off valve arranged upstream of the tube in the flow direction.

According to a further advantageous development, it is possible for the carrier element to take the form of zeolite granules. The zeolite granules may more particularly have a graining of 0.6 mm to 1.0 mm. The zeolite granules and/or another carrier material may preferably be disposed in a collecting unit disposed within the reaction vessel, this collecting unit taking the form preferably of a fabric pouch. In this way it is possible to prevent the carrier material being carried into regions within the receiving space that are difficult to aerate and/or difficult to bring about mixing in.

Alternatively or additionally, at a base or the base of a collecting unit or of the collecting unit already referred to above, there may be a further aeration device, allowing oxygen to be introduced into the zeolite granules and/or into another carrier element. The further aeration device may preferably be connected to a bypass gas line diverted from a main gas line. With the further aeration device, flow of oxygen around the zeolite granules and/or another carrier element is possible to particularly good effect.

In order to be able more effectively to prevent the sedimentation of suspension solids on the base of the receiving space, the feed line may open into the reaction vessel above and/or at the same height at the drain line. Descending particles can therefore preferably be introduced into the receiving space at a greater height and discharged from the receiving space at a greater depth. Alternatively or additionally, the bioreactor may comprise a plurality of feed lines and/or a plurality of drain lines. Preferably here, by means of an adjustable suspension flow direction, it is possible at least partly to define whether a line in the bioreactor serves as a feed line or as a drain line when the bioreactor is in use. This makes it possible to configure at least two different flow directions within the reaction vessel, preferably simultaneously, in which case existing lines can be utilized as a feed line or a drain line depending on the flow direction. Thus, for example, at least two drain lines in the vicinity of the base may lead out of the reaction vessel, in order to allow settled particles and suspension to be taken off even more efficiently.

So that particularly good circulation of the suspension is achievable within the receiving space of the reaction vessel, it may be possible to set at least two suspension flow directions within the reaction vessel and/or within the lines of the bioreactor, by means of a pumping apparatus or of the pumping apparatus already mentioned earlier on herein. To achieve particularly effective circulation, it is possible alternatively or additionally for the feed line and the drain line to be separate from one another through a pumping apparatus or the pumping apparatus already mentioned earlier on herein. The bioreactor may more particularly have a suspension circuit encompassing the feed line, the drain line, the pumping apparatus and the reaction vessel, allowing the suspension to be guided repeatedly past the biofilm within the reaction vessel.

For easier regulation of the suspension flow, a shut-off valve may be disposed in the feed line between the reaction vessel and a or the pumping apparatus, and/or a shut-off valve may be disposed in the drain line between the reaction vessel and a or the pumping apparatus.

According to an advantageous development of the bioreactor, a bypass feed line which opens out into the reaction vessel may branch off from the feed line, more particularly downstream of a or the pumping apparatus and/or upstream of a or the shut-off valve. Accordingly a suspension can additionally also be introduced into the reaction vessel by way of the bypass feed line. The bypass feed line may preferably have a shut-off valve. More preferably it is possible for the bypass feed line to be able to be used as a drain line in the event of a change, more particularly a reversal, in the suspension flow direction through the pumping apparatus. This allows the variability of the flow pathways to be increased, leading to even better circulation of the suspension in the reaction vessel.

It may be particularly useful if the colonization surface is colonized with a biofilm which comprises ammonifying and/or nitrifying bacteria. In this case, for example, a fraction of ammonifying and/or nitrifying bacteria may make up at least 2% of the biofilm, preferably at least 4%, preferably at least 6%, preferably at least 10%, preferably at least 15%, preferably at least 20%, preferably at least 25%, preferably at least 30%, preferably at least 40%, preferably at least 50%, preferably at least 60%, preferably at least 70%, preferably at least 80%, preferably at least 90%, preferably approximately 100%.

In order to maximize the surface area for colonization by the microorganisms, the at least one carrier element may have a plurality of colonization surfaces, and the colonization surfaces may have a curved design, allowing adhesion and/or lying of colonization surfaces of a carrier element on one another, and/or adhesion and/or lying of the colonization surfaces of different carrier elements on one another, to be avoided.

The object stated above is also achieved in accordance with the invention by the features of the independent process claim for producing an organic nutrient solution. More particularly, therefore, for achieving the stated object, a process for producing an organic nutrient solution is proposed, where the organic nutrient solution comprises a fraction of at least 10%, more particularly at least 25%, preferably at least 50%, more preferably at least 75%, of plant-available, mineralized nitrogen, based on the total nitrogen content of the organic nutrient solution. Preferably in this case a nitrate fraction of the plant-available, mineralized nitrogen is higher than an ammonium fraction. With particular preference here it is possible for a $NO_3:NH_4^+$ ratio in the organic nutrient solution to be at least 2:1, more particularly at least 3:1, more particularly at least 10:1, preferably at least 25:1, more preferably at least 50:1. The process in this case comprises the following steps:

in a seeding step, seeding a carrier element, preferably a carrier element of the bioreactor as described and claimed herein, with a seed material which comprises ammonifying and/or nitrifying bacteria, forming a biofilm with ammonifying and/or nitrifying bacteria on the carrier element, in an incubation step, incubating an organic residual and/or waste material with the biofilm, more particularly in a reaction vessel, where the ammonifying and/or nitrifying bacteria convert organically bonded nitrogen in the residual and/or waste material into mineralized nitrogen.

Through the process it is possible for the first time, from organic residual and/or waste materials, to produce an organic nutrient solution which can be used as a plant fertilizer and in which the fraction of plant-available nitrogen has been drastically increased by virtue of the specific process. According to one preferred embodiment, in the context of the plant-available nitrogen, it is also possible thereby to achieve a significant shift in the ratio of nitrate fraction to ammonium fraction toward the nitrate. Especially in soil-free, hydroponic systems, plants are dependent in particular on nitrate, as nitrate can be taken up more effectively. Furthermore, it is also possible to achieve a distinct reduction in, or even complete neutralization of, the odor nuisance that often accompanies organic residual and/or waste materials, this odor nuisance possibly arising in particular from ammonium, in the case of the completed organic nutrient solution.

The object stated above is also achieved in accordance with the invention through the features of the independent process claim for producing a substrate material for cultivating plants. In particular, therefore, for the purpose of achieving the stated object, a process is proposed for producing a substrate material for cultivating plants, comprising the steps of:

in a seeding step, seeding a carrier element, preferably a carrier element of the bioreactor as claimed in any of the preceding claims, with a seed material which comprises ammonifying and/or nitrifying bacteria, forming a biofilm with ammonifying and/or nitrifying bacteria on the carrier element.

By virtue of the process described above it is therefore possible to seed carrier elements with ammonifying and/or nitrifying bacteria and to cause a biofilm thereof to grow on the carrier element. The carrier element may then be employed, for example, in a bioreactor, as described and claimed herein, or as substrate material, as described and claimed herein.

Advantageous developments below relate to both of the above-described processes.

In order to enable particularly effective seeding and/or conversion, the seed material and/or the organic residual and/or waste material can be used in liquid form. The seed material and/or the organic residual and/or waste material may preferably be used in a suspension form. This enables particularly effective wetting of the carrier element with the seed material and/or with the organic residual and/or waste material. Moreover, particularly easy-to-implement and effective circulation of the organic residual and/or waste material is possible. For this purpose, for example, mixing of an organic residual and/or waste material and/or seed material present in solid form with water may be envisaged, in order to produce a suspension.

It may be advantageous if the seed material or a combination of one or more seed materials is used that is selected from the group consisting of compost, more particularly bark compost, worm excrement, more particularly earthworm excrement, and earth, more particularly field earth. As well as ammonifying and/or nitrifying bacteria, these seed materials additionally comprise mucilages and/or proteins, which accelerate the formation of the biofilm on the carrier element and stabilize the biofilm. Suitable in principle is excrement from worms which live in the soil, since such excrement is rich in ammonifying and/or nitrifying bacteria.

According to one particularly advantageous embodiment, a fraction of organic material in the organic residual and/or waste material may be from 5% to 60%.

Alternatively or additionally, a carbon/nitrogen ratio in the organic residual and/or waste material may be 11 or less. At levels above 11, the conversion rates deteriorate.

It may be advantageous also if a total nitrogen fraction, based on the total weight of the organic residual and/or waste material, is at least 0.3%.

Provision may further be made for a fraction of nitrate-bound nitrogen, based on the total content of the plant-available nitrogen in the organic residual and/or waste material, to be lower than a fraction of ammonia-bound nitrogen. The process allows this ratio to be shifted, so that nitrate is present on a majority basis rather than ammonium.

In order to provide ideal growth conditions for the ammonifying and/or nitrifying bacteria, it is possible for individual steps or all the steps of the process to be carried out at a temperature, more particularly at a constant temperature, of 20° C. to 34° C., preferably of 22° C. to 32° C.

In order to prevent unwanted denitrification processes due to anaerobic denitrifying bacteria, and in order to provide the aerobic ammonifying and/or nitrifying bacteria with a sufficient oxygen supply, oxygen may be introduced into the reaction vessel and/or into the carrier element during the implementation of individual or all the steps.

In order to be able better to prevent colonization by anaerobic bacteria during the seeding step, the seed material may be circulated during the seeding step. This is achieved more particularly by pumping the seed material, multiple times and/or in different flow directions, through a circuit, preferably a closed circuit, in which the carrier element is arranged. In particular, as a result of the circulation, portions of the biofilm and seed material that has stuck on the carrier element can be removed and is able to adhere again elsewhere. This removal and renewed adhesion is beneficial to bacterial growth.

Alternatively or additionally, the organic residual and/or waste material may be circulated during the incubating step in order more effectively to prevent sedimentation of solids and the incidence of anaerobic degradation processes. The organic residual and/or waste material may more particularly be pumped through a circuit, preferably a closed circuit, repeatedly and/or in different flow directions, the carrier element being disposed in this circuit.

In order to be able to increase further the conversion efficiency of the bacteria, the seeding step may be divided into a first phase, with continuous aeration and/or circulation, and a second phase, with discontinuous aeration and/or circulation. In this case, during the second phase, aeration pauses and/or circulation pauses may preferably be implemented, these pauses being more particularly from 30 to 50 minutes per hour.

It may also be useful if the seeding step and the incubating step are carried out in different reaction vessels. The reaction vessel used during the seeding step may preferably have a lower volume than the reaction vessel used during the incubating step.

Provision may further be made for the incubating step to comprise an ammonifying step and/or a nitrifying step, with organically bound nitrogen from the organic residual and/or waste material being converted by the ammonifying bacteria of the biofilm into ammonium during the ammonifying step, and/or with ammonium being converted into nitrate by the nitrifying bacteria of the biofilm during the nitrifying step. Depending on which organic residual and/or waste material is used and which initial fractions of plant-available nitrogen it comprises, there may sometimes be only one nitrifying step provided. The incubating step may in particular be carried out until there is more nitrate than ammonium in the organic nutrient solution, preferably until a $NO_3:NH_4+$ ratio is at least 2:1, more particularly at least 3:1, preferably at least 10:1, preferably at least 25:1, more preferably at least 50:1. In order to ascertain the fraction of plant-available nitrogen, it is preferably possible to conduct a measuring step at regular intervals or continuously. In that case it is possible to employ measurement methods known to the skilled person for determining a nitrate concentration and/or ammonium concentration and/or a total nitrogen concentration.

According to one particularly advantageous development, the carrier element used may be at least one porous tube, more particularly a porous rubber-plastic tube, with oxygen and seed material and/or oxygen and residual and/or waste material being introduced into the tube at separate times. It is possible in this case, preferably, to vary a tube internal pressure during the seeding step and/or during the incubating step, more particularly by increasing a flow rate of seed material and/or of residual and/or waste material through the tube for one period, and/or by increasing a volume flow of oxygen through the tube for one period. The advantage of the porous tube form of the carrier element is that it provides a relatively large colonization surface for the microorganisms. An open-pore configuration has the effect, in particular, of allowing a suspension pressed through the tube to emerge additionally also via pores which penetrate the tube wall. This enables, firstly, particularly effective seeding of all the colonization surfaces, and also, moreover, particularly effective supply of oxygen and nutrient to the bacteria of the biofilm. The tube may more particularly be flexible, i.e., stretchable, in design, with the advantage that, when a pressure within the tube increases, the pore diameters can be expanded. It is thereby possible at least for a short time to achieve an increased flow rate through the pores, in order, for example, to achieve more effective circulation of the suspension within the tube as well.

In order to be able to achieve particularly effective wetting of the carrier material, the carrier element may be immersed fully in the seed material during the seeding step and/or the carrier element may be immersed fully in the residual and/or waste material during the incubating step.

The invention relates, moreover, to an organic nutrient solution, more particularly an organic plant fertilizer, produced by the process as described and claimed herein, and/or in a bioreactor as described and claimed herein, with a fraction of at least 10%, more particularly at least 25%, preferably at least 50%, more preferably at least 75%, of plant-available mineralized nitrogen, based on the total nitrogen content of the organic nutrient solution. Preferably in this case a nitrate fraction of the plant-available, mineralized nitrogen is higher than an ammonium fraction. With further preference a $NO3:NH4^+$ ratio in the organic nutrient solution is at least 2:1, more particularly at least 3:1, more particularly at least 10:1, preferably at least 25:1, more preferably at least 50:1. The organic nutrient solution has the advantage that, unlike mineral fertilizers produced industrially, it can also be used in organic farming. Organic plant fertilizers produced purely from organic residual and/or waste materials and having a high nitrogen mineralization rate of this kind have not hitherto been known.

The organic nutrient solution preferably comprises a liquid fertilizer.

So that the organic nutrient solution can be used in organic farming, it is necessary for the plant-available mineralized nitrogen to have been converted exclusively or substantially from organically bound nitrogen and/or for the organic nutrient solution to be free from industrially produced mineral fertilizer. Industrially produced mineral fertilizer includes, for example, mineral salts obtained by chemical or physical processing from raw materials, especially raw materials produced in mining, and hence, more particularly, nitrogen fertilizers which do not have any organic origins. Examples of possible organic residual and/or waste material, used as starting material for producing the organic nutrient solution, include plant and/or animal wastes, fermentation residues, especially from biogas plants, liquid manure, solid manure, slurry, stable dung and organic secondary raw materials from the food, tobacco and feedstuff industries.

The invention relates further to a substrate material for cultivating plants, with a biofilm comprising ammonifying and/or nitrifying bacteria, produced by the process as described and claimed herein, and/or by means of the bioreactor as described and claimed herein. The carrier element may preferably comprise pores and/or cavities having a diameter of 10 µm to 100 µm.

According to one advantageous development of the substrate material, the carrier element may be designed as a porous tube. The carrier element may preferably be designed as a tube produced of a plastic-rubber mixture. Reference here is made to the possible implementations of the carrier element of the bioreactor that can also be employed in relation to the substrate material.

According to a further advantageous development of the substrate material, the carrier element may be produced of a mineral, more particularly of zeolite. The carrier element may in particular take the form of zeolite granules. Zeolite is especially suitable as a soil assistant, since by virtue of its porous configuration it has a particularly high surface area, made up of internal and external surface areas, which are able to serve as a colonization surface. In spite of the relatively large colonization surface, therefore, the zeolite nevertheless has a relatively small footprint.

In order to be able to provide better protection from nutrient deficiency and/or water deficiency to plants which are cultivated in contact with or in the vicinity of the substrate material, the carrier element may have a sponge effect, allowing the substrate material to store liquids. This can be achieved, for example, by the carrier element being produced at least partly of a foamed material, more particularly of a foamed plastic.

The invention further relates to the use of ammonifying and/or nitrifying bacteria in the form of a biofilm on a carrier element, more particularly in a bioreactor as described and claimed herein, for converting organic residual and/or waste materials into an organic nutrient solution with a fraction of at least 10%, more particularly at least 25%, preferably at least 50%, more preferably at least 75%, of plant-available mineralized nitrogen, based on the total nitrogen content of the nutrient solution, more particularly by means of an implementation of the process as described and claimed herein. Here, preferably, in the completed organic nutrient solution, a $NO3:NH4+$ ratio is at least 2:1, more particularly at least 3:1, more particularly at least 10:1, preferably at least 25:1, more preferably at least 50:1.

The invention relates, moreover, to the use of the organic nutrient solution as described and claimed herein for fertilizing plants, more particularly for fertilizing plants being cultivated according to criteria of organic farming. By means of the organic nutrient solution, soil leaching occurring particularly in the last growth third of crop plants can be better compensated than with conventional organic plant fertilizers.

According to one advantageous embodiment, the organic nutrient solution may be used in hydroponic cultivation systems, more particularly in soil-free and/or in low-soil hydroponic cultivation systems. In contrast to other purely organic plant fertilizers, the organic nutrient solution is also suitable for use in soil-free and/or low-soil cultivation systems, because the fraction of plant-available nitrogen, more particularly of plant-available nitrate, is significantly higher than in the case of conventional organic plant fertilizers.

The invention further relates to the use of the substrate material as described and claimed herein for cultivating plants. In particular, for cultivating crop plants. The substrate material may preferably be mixed into a planting earth, more particularly as a soil assistant. In particular it may be mixed into arable soil in a field. It is possible by these means to accelerate the conversion processes of ammonification and/or of nitrification that operate naturally in the soil. As a result, nitrogen bound organically in the soil can be converted more quickly into plant-available nitrogen. This allows the fertility of natural soils, and the cultivation yields, to be boosted.

Alternatively or additionally, the substrate material may be used as an anchoring material, especially in a hydroponic cultivation system. The substrate material may therefore serve to enable plants to hold fast to it when the earth needed for that purpose per se is absent or is present in an inadequate form.

According to one preferred development, the plants may be at least partly, via their roots, in direct contact with an outer side of the carrier element of the substrate material. In particular, an organic nutrient solution, more particularly as described and claimed herein, may be passed through the carrier element. The organic nutrient solution is preferably then able to diffuse and/or be pressed through pores in a carrier element wall from an inner side of the carrier element to the outer side of the carrier element. This enables the possibility of particularly effective supply of nutrients to the plants. Thus it is possible, for example, to install the carrier element in an arable soil. Moreover, the carrier element in this form may also be used, as already observed above, in a low-soil or soil-free system.

According to one particularly preferred development, the plants may be at least partially in direct contact, via their roots, with an outer side of the carrier element of the substrate material, with an organic residual and/or waste material being passed through the carrier element, where organically bound nitrogen in the residual and/or waste material is converted into mineralized nitrogen by the bacteria of the biofilm, where the mineralized nitrogen diffuses and/or is pressed through pores in a carrier element wall from an inner side of the carrier element to the outer side of the carrier element, and where the roots of the plants that are at least partially in contact with the outer side of the carrier element take up the plant-available, mineralized nitrogen. The organic residual and/or waste material may therefore be employed directly for supplying plants, without any prior need for a separately implemented conversion into organic nutrient solution. In this case it has emerged, surprisingly, that because of the efficient conversion of the organically bound nitrogen into plant-available nitrogen by the biofilm on the carrier element, the plants are adequately supplied with nitrogen.

The invention relates further to a set composed of a bioreactor, as described and claimed herein, and a seeding material for seeding the carrier element and for forming a biofilm with ammonifying and/or nitrifying bacteria.

The invention relates, moreover, to a set composed of a carrier element and a seeding material for seeding the carrier element and for forming a biofilm with ammonifying and/or nitrifying bacteria, more particularly for performing a process as described and claimed herein, and/or in a bioreactor as described and claimed herein, and/or for the use as described and claimed herein.

The invention relates, further, to the use of an organic nutrient solution as described and/or claimed herein, and/or produced by a process and/or in a bioreactor, as described and/or claimed herein, as a means for binding and/or enriching carbon in plants and/or soils, preferably by alkaline earth metals present in the soil and/or by alkaline minerals in the ground water and weathering of the mineral substances in the topsoil.

The invention is now elucidated in more detail using working examples, but is not restricted to these working examples. Further working examples are produced by combination of the features of individual or multiple claims with one another and/or with individual or multiple features of the working examples.

WORKING EXAMPLES

Example 1

For implementing the process for producing an organic nutrient solution, the examples below utilize a bioreactor as described and claimed herein.

The receiving space of the reaction vessel is first charged with fermentation residues, obtained from the fermentation of biowastes assembled from separate collection from private households (92%), plant materials from food, tobacco and feedstuff production, plant materials from horticulture and landscaping, from forestry, fat and fatty residues, with a low fraction of plant-available nitrogen (less than 1%).

An alternative or supplementary charging material may be fermented sugar beet molasses (Vinasse) as a residual material from the food and feedstuff industry, with a fraction of available nitrogen of less than 0.5%.

The carrier elements are each seeded, as elucidated above, in a first vessel.

A second container is then charged with the seeded plastic carrier material in chip form, with a weight of 200 g and an estimated plastic contact area of 1.76 m², and made up with 720 ml of the organic liquid fermentation residue and 11 l of water.

The fermentation residue is as follows:
0.46% N total nitrogen
0.18% N ammonium nitrogen
0.12% $P_2O_5$ total phosphate
0.42% K2O total potassium oxide
0.0029% Zn total zinc
Secondary constituents:
0.11% MgO total magnesium oxide
0.04% S sulfur
0.66% CaO basic constituents
6.41% organic matter
Gross density 1040 kg/m³
pH 8.4

Arithmetically, therefore, the total nitrogen in the starting solution is 294 mg/l. The initial values for the fermentation residue material introduced, together with 11 l of water, are as follows (measured using MQuant™ test strips from Merck KGaA, 64271 Darmstadt, Germany):
pH=7.4
$NH_4$=200 mg/l, i.e., NH4-N=155 mg/l
$NO_3$=0 mg/l During the incubating step, the liquid is conditioned to 25° C. and air is blown in for 6 minutes per hour and 14 hours per day. This corresponds to a total air quantity of 25.2 m³ per day.

After 5 days, the $NO_3$ value is 250 mg/l (corresponding to 56 mg/l of $NO_3$—N) and the $NH_4$ value has dropped to 90 mg/l (corresponding to 70 mg/l of $NH_4$—N). After 9 days, the $NO_3$ value reaches its maximum of 1000 mg/l (226 mg/l of $NO_3$—N) and the $NH_4$ value is 15 mg/l (12 mg/l of $NH_4$—N). At this point in time, 81% (238 mg/l) of the total nitrogen present in the initial solution is in plant-available form. The nitrogen is present in an $NO_3$-to-$NH_4$ ratio of 50:1. In the initial solution, 39% of the total nitrogen is present in directly plant-available form 100% as $NH_4$.

In central Europe, the mean annual mineralization rate in the soil, depending on temperature and soil humidity, is about 1-2% of the organic nitrogen. At a mineralization rate of 2%, the calculated total nitrogen of 294 mg/l in the soil would mineralize at 5.88 mg/l per year. After 9 days, 0.145 mg/l would be mineralized. With this utilization, the result would be a mineralization rate more than 1500 times higher as compared with soil mineralization.

Example 2

In this case the organic residual and/or waste material employed comprises Vinasse.

The second container is charged with the seeded plastic carrier material in chip form, with a weight of 150 g and an estimated plastic contact area of 1.32 m², and made up with 60 ml of Vinasse and 93 l of water.

The Vinasse is as follows:

4.5% N total nitrogen
0.5% N available nitrogen
6% $K_2O$ total potassium oxide
Secondary constituents:
1.5% S water-soluble sulfur
2.5% Na water-soluble sodium
48% organic matter
Density 1360 kg/m$^3$ Arithmetically, therefore, the total nitrogen is 40 mg/l. The initial values for the Vinasse introduced, together with 93 l of water, are as follows (measured using MQuant test strips from Merck KGaA, 64271 Darmstadt, Germany):

pH=6.8
NH4=20 mg/l, i.e., NH4-N=16 mg/l
NO3=5 mg/l, i.e., NO3-N=1.2 mg/l

During the incubating step, the liquid is conditioned to 25° C. and air is blown in for 10 minutes per hour and 14 hours per day. This corresponds to a total air quantity of 42 m$^3$ per day.

After 5 days the $NH_4$ value is 45 mg/l (corresponding to 35 mg/l of $NH_4$—N) and after 9 days is a maximum value of 80 mg/l (corresponding to 62 mg/l of $NH_4$—N). After 9 days the $NO_3$ value is 3 mg/l and rises to a maximum value of 240 mg/l (50 mg/l of $NO_3$—N) on day 11. At this point in time the $NH_4$ value is 8 mg/l (6 mg/l of $NH_4$—N).

At this point in time, 140%* (56 mg/l) of the total nitrogen present in the initial solution is in plant-available form. The nitrogen is present in an $NO_3$-to-$NH_4$ ratio of 8:1. In the initial solution, 11% of the total nitrogen is present in directly plant-available form in an $NO_3$-to-$NH_4$ ratio of 1:10.

In central Europe, the mean annual mineralization rate in the soil, depending on temperature and soil humidity, is about 1-2% of the organic nitrogen. At a mineralization rate of 2%, the calculated total nitrogen of 40 mg/l in the soil would mineralize at 0.8 mg/l per year. After 9 days, 0.02 mg/l would be mineralized. With this utilization, the result would be a mineralization rate more than 2500 times higher as compared with soil mineralization.

*The total nitrogen is ascertained in accordance with the Kjeldahl method. This method definitively determines the nitrogen contained in the protein fraction, while not capturing the fluctuations in the nitrogen fraction as a function of the amino acid composition. It follows from this that the actual nitrogen fraction in the starting material is higher than the value ascertained by Kjeldahl analysis.

Example 3

The carrier material used here is a porous tube.

Fermentation residues obtained from the fermentation of biowastes assembled from separate collection from private households (92%), plant materials from food, tobacco and feedstuff production, plant materials from horticulture and landscaping, from forestry, fat and fatty residues, with a low fraction of available nitrogen (less than 1%) are passed through the seeded carrier element in tube form.

The material passed through the seeded carrier element in tube form may alternatively or additionally comprise fermented sugar beet molasses (Vinasse) as residual material from the food and feedstuff industry, with a fraction of available nitrogen of less than 0.5%.

Emerging from each of the pores of the carrier element in tube form is a nutrient solution containing immediately plant-available, mineralized N, which is taken up by plant roots in contact with the substrate, as an immediately plant-available, mineral nutrient solution.

This is topped up with 720 ml of organic liquid fermentation residue and 13 l of water.

The composition of the fermentation residue is as follows:

0.46% N total nitrogen
0.18% N ammonium nitrogen
0.12% $P_2O_5$ total phosphate
0.42% K2O total potassium oxide
0.0029% Zn total zinc
Secondary constituents:
0.11% MgO total magnesium oxide
0.04% S sulfur
0.66% CaO basic constituents
6.41% organic matter
Gross density 1040 kg/m$^3$
pH 8.4

Arithmetically, therefore, the total nitrogen in the initial solution is 251 mg/l. The fermentation residue material introduced has the following initial values (measured using MQuant test strips from Merck KGaA, 64271 Darmstadt, Germany):

pH=7.2
NH4=180 mg/l, i.e., 140 mg/l of $NH_4$—N
NO3=0 mg/l

On measurement of the drops of collected liquid (A) and on the outer surface of the seeded carrier element in tube form (B), the values obtained after 3 days are as follows:

| | NO3 (NO3—N) mg/l | NH4 (NH4—N) mg/l | NO3 to NH4 ratio |
|---|---|---|---|
| A | 40 (9) | 190 (148) | 1:4.75 |
| B | 300 (69) | 50 (34) | 6:1 | and after 5 days:

| | NO3 (NO3—N) mg/l | NH4 (NH4—N) mg/l | NO3 to NH4 ratio |
|---|---|---|---|
| A | 50 (11) | 180 (140) | 1:3.6 |
| B | 500 (113) | 80 (62) | 6.25:1 |

For an unseeded carrier element in tube form, supplied in parallel with the initial solution, the values obtained after both 3 and 5 days are the initial values measured for A and B.

Example 4

25 ml of the organic vinasse and 10 l of water are made up through the seeded carrier element in tube form.

The composition of the vinasse is as follows:

4.5% N total nitrogen
0.5% N available nitrogen
6% $K_2O$ total potassium oxide
Secondary constituents:
1.5% S water-soluble sulfur
2.5% Na water-soluble sodium
48% organic matter
Density 1360 kg/m$^3$ Arithmetically, therefore, the total nitrogen in the initial solution is 153 mg/l. The initial values for the vinasse introduced, together with 10 l of water, are as follows (measured using MQuant test strips from Merck KGaA, 64271 Darmstadt, Germany):

pH=6.5
NH4=15 mg/l, i.e., 12 mg/l of $NH_4$—N
NO3=0 mg/l

On measurement of the drops of collected liquid (A) and on the outer surface of the seeded plant substrate in tube form (B), the following values are obtained after 1 day:

|   | NO3 (NO3—N) mg/l | NH4 (NH4—N) mg/l | NO3-to-NH4 ratio |
|---|---|---|---|
| A | 35 (27) | 5 (4) | 7:1 |
| B | 35 (27) | 5 (4) | 7:1 | after 7 days:

|   | NO3 (NO3—N) mg/l | NH4 (NH4—N) mg/l | NO3-to-NH4 ratio |
|---|---|---|---|
| A | 5 (1) | 80 (62) | 1:16 |
| B | 90 (21) | 8 (6) | 11:1 | after 14 days:

|   | NO3 (NO3-N) mg/l | NH4 (NH4-N) mg/l | NO3-to-NH4 ratio |
|---|---|---|---|
| A | 20 (5) | 150 (117) | 1:7.5 |
| B | 400 (92) | 70 (55) | 5.7:1 |

For an unseeded carrier element in tube form, supplied in parallel with the initial solution, the values obtained after 1, 7 and 14 days are the initial values measured for A and B.

Example 5

The carrier element used is zeolite granules.

The seeded zeolite granules are admixed to a planting soil. Fermentation residues obtained from the fermentation of biowastes assembled from separate collection from private households (92%), plant materials from food, tobacco and feedstuff production, plant materials from horticulture and landscaping, from forestry, fat and fatty residues, with a low fraction of available nitrogen (less than 1%), are added to the zeolite-soil mixture.

Alternatively or additionally, fermented sugar beet molasses (vinasse) as residual material from the food and feedstuff industry, with a fraction of available nitrogen of less than 0.5% may be added to the zeolite-soil mixture.

The second container is charged with seeded zeolite granules, with a weight of 400 g and an estimated contact area of 21.6 m², and topped up with 440 ml of the organic liquid fermentation residue and 28 l of water.

The composition of the fermentation residue is as follows:
0.46% N total nitrogen
0.18% N ammonium nitrogen
0.12% $P_2O_5$ total phosphate
0.42% $K_2O$ total potassium oxide
0.0029% Zn total zinc
Secondary constituents:
0.11% MgO total magnesium oxide
0.04% S sulfur
0.66% CaO basic constituents
6.41% organic matter
Gross density 1040 kg/m³
pH 8.4

Arithmetically, therefore, the total nitrogen in the initial solution is 74 mg/l. The fermentation residue material, together with 28 l of water, introduced has the following initial values (measured using MQuant test strips from Merck KGaA, 64271 Darmstadt, Germany):
pH=7.4
$NH_4$=80 mg/l, i.e., 56 mg/l of $NH_4$—N
$NO_3$=5 mg/l, i.e., 1 mg/l of $NO_3$—N After 5 days the $NO_3$ value is 75 mg/l (corresponding to 17 mg/l of $NO_3$—N) and the $NH_4$ value has dropped to 5 mg/l (corresponding to 4 mg/l of $NH_4$—N). At this point in time, 28% (21 mg/l) of the total nitrogen contained in the initial solution is in plant-available form. The nitrogen here is present in an $NO_3$-to-$NH_4$ ratio of 15:1. In the initial solution, 77% of the total nitrogen is present in an $NO_3$-to-$NH_4$ ratio of 1:16.

BRIEF DESCRIPTION OF THE DRAWINGS

The invention is described more exactly below with reference to the figures, where.

DETAILED DESCRIPTION

Figure 1:
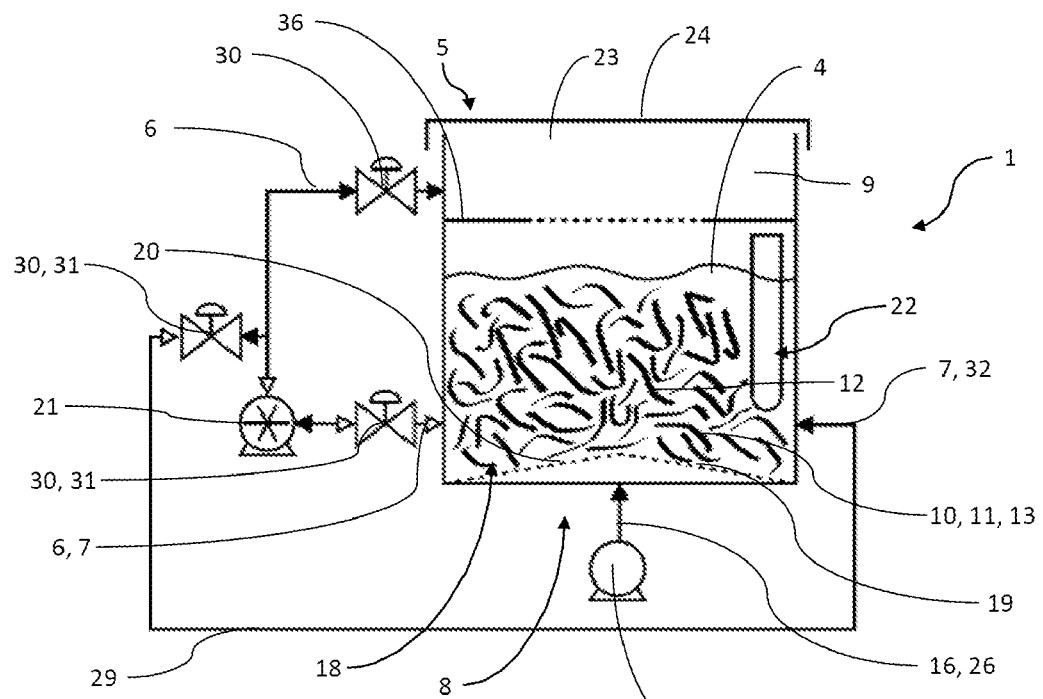
FIG. 1 shows a first variant embodiment of a bioreactor with a plurality of plastic chips as carrier elements, joined together to form a tangle.
Figure 2:
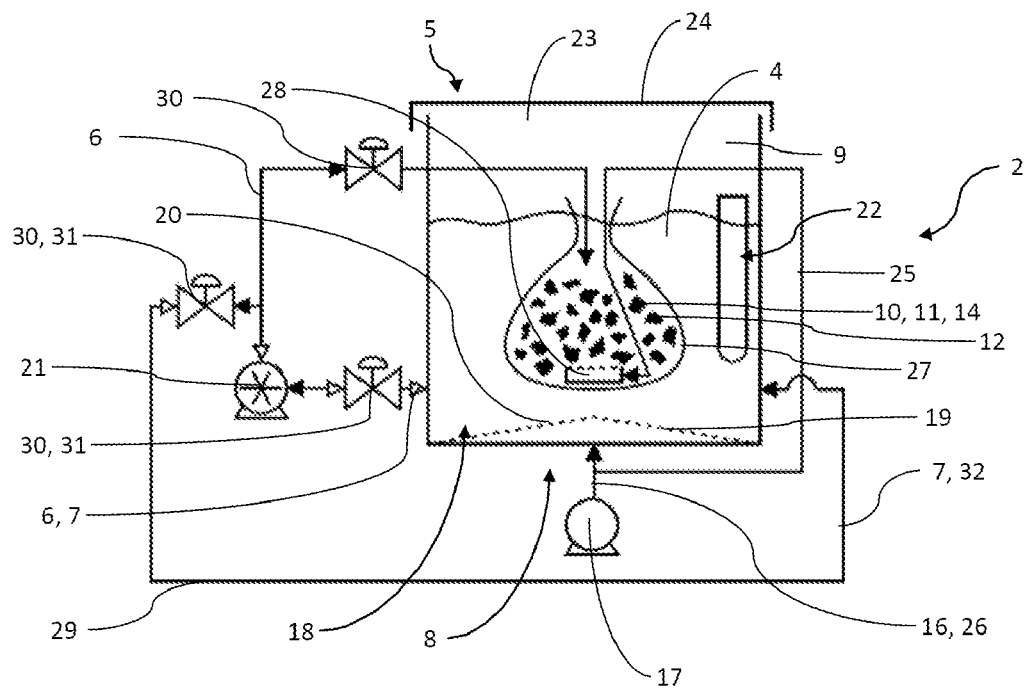
FIG. 2 shows a second variant embodiment of a bioreactor with a plurality of carrier elements in the form of zeolite granules, disposed in a fabric pouch within the receiving space of the bioreactor.
Figure 3:
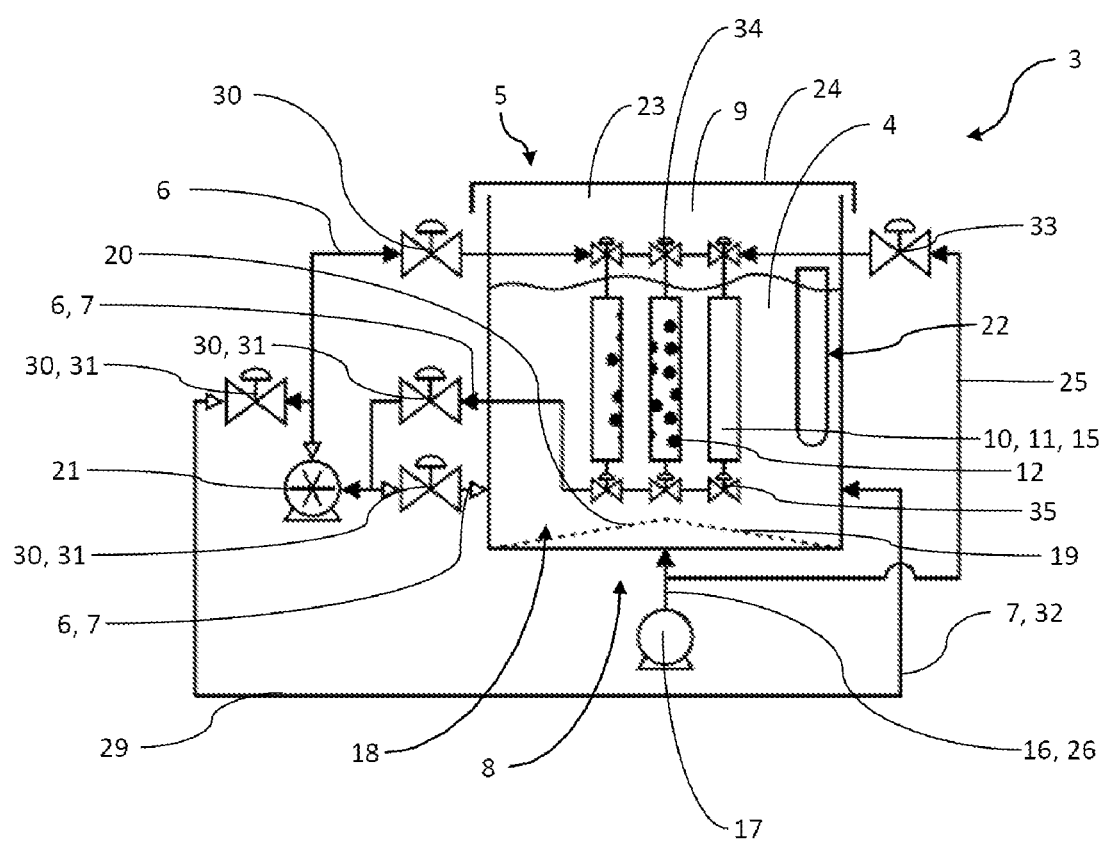
FIG. 3 shows a third variant embodiment of a bioreactor with three carrier elements each in the form of porous tubes, which are connected parallel to one another in a line within the receiving space.

FIGS. 1 to 3 show three different exemplary embodiments of a bioreactor, each identified as a whole by 1, 2 or 3. The bioreactors 1, 2 and 3 are configured for the conversion of organic residual and/or waste materials into an organic nutrient solution with a relatively high fraction of plant-available mineralized nitrogen.

By means of the bioreactor 1, 2, 3, therefore, a process for producing the organic nutrient solution can be carried out, where a fraction of at least 10% of plant-available nitrogen is envisaged, based on the total nitrogen content of the nutrient solution. Moreover, for the plant-available mineralized nitrogen, the nitrate fraction is to be higher than the ammonium fraction.

The bioreactor 1, 2, 3 comprises a reaction vessel 5 into which a feed line 6 opens from and from which a drain line 7 exits. Via the feed line 6 a suspension 4 can be introduced into the reaction vessel, and via the drain line 7 the suspension can be discharged again after passage through the reaction vessel 5.

The bioreactor 1, 2, 3 comprises an aeration device 8 via which oxygen, preferably in the form of air, can be introduced into the reaction vessel 5. In the exemplary embodiments shown in FIGS. 1 to 3, the aeration device 8 has a compressor 17. Using the compressor 17, oxygen in the form of air can be introduced into the reaction vessel 5 by way of a gas supply line 16.

The three bioreactors 1, 2 and 3 differ essentially in having different carrier elements 10, each disposed within a receiving space 9 of the reaction vessel 5. The carrier elements 10 are disposed within the receiving space 9 in such a way that the suspension 4 introduced via the feed line 6 is able to flow around the carrier elements 10. The suspension 4 may be, for example, an organic residual and/or waste material, as described above, and/or an organic seeding material, as described above. Additionally, the carrier elements 10 are also arranged in such a way that the oxygen introduced by means of the aeration device 8 flows around the carrier element 10, preferably substantially on all sides.

The carrier elements 10 have a particularly large surface in relation to their volume. The surfaces of the carrier elements 10 here are designed as colonization surfaces 11 for the development of a biofilm 12, which consists at least partially of ammonifying and/or nitrifying bacteria. The colonization surfaces 11 are therefore designed, for example, to be rougher than an inner side of a reaction vessel wall. This allows the microorganisms in the biofilm 12 to adhere particularly well to the colonization surfaces 11 and to grow on them. This makes it possible for the ammonifying and/or nitrifying bacteria to form a biofilm 12 substantially on the colonization surfaces 11, since here ideal growth conditions can be generated.

The carrier elements 10 of the various exemplary embodiments in FIGS. 1 to 3 are produced in part of different materials or combinations of multiple materials.

The carrier elements 10 of the bioreactor 1 from FIG. 1 are produced as chips 13 made of plastic. For example, these chips 13 may arise as waste products when machining a plastic blank. It may be particularly advantageous here for the chips to consist of a thermoplastic, such as a polypropylene and/or polyethylene, for example. The multiplicity of chips 13 are disposed in an unordered way within the receiving space 9 of the reaction vessel 5. The result is a real entanglement of the chips 13. Because the chips 13 have a curved colonization surface 11, which may form, for example, because of a serpentine and/or spiral and/or wavy form of the chips 13, it is easily possible to prevent the colonization surfaces 11 of individual chips 13 from sticking to or lying on one another. Sticking or lying is disadvantageous since gas exchange and/or surrounding flow would no longer be able to be guaranteed and consequently a biofilm of anaerobic bacteria might be formed. This could result exactly in the unwanted effect of denitrification processes occurring in particular.

In the case of the bioreactor 2 from FIG. 2, the carrier elements 10 take the form of zeolite granules 14. In order to be able to prevent the granules 14 depositing in regions of the receiving space 9 where there is poor transit flow or poor aeration, the carrier elements 10 in the form of granules 14 are disposed in a collecting unit 27, designed as a fabric pouch. The collecting unit 27 may be securable within the receiving space by means of a hanger. Within the collecting unit 27 there is a further aeration device 28, which can be supplied with oxygen via a bypass gas line 25. Furthermore, a supply line 6 extending within the reaction vessel 5 leads into the collecting unit 27 and ends there, so allowing the suspension 4 to be introduced directly into the collecting unit 27. The collecting unit 27 has an open porosity, allowing the suspension to emerge from the collecting unit 27 into the receiving space 9. The bypass gas line 25 branches off from a main gas line 26, which is connected to the aeration device 8. Accordingly it is possible to introduce oxygen into the receiving space 9 at two different locations, without the need for a second compressor 17.

The bioreactor 3 from FIG. 3 comprises three carrier elements 10, which are each designed as porous tubes 15 and which are integrated parallel to one another into a line system within the receiving space 9. The tubes 15 are each connected to the feed line 6 and to a gas supply line 16, which takes the form of a bypass gas line 25. In this way, suspension 4 and oxygen can be introduced into the tubes 15, in particular at separate times. In order to stop the introduction of oxygen or suspension 4 into a tube 15 or two or more of the tubes 15, a shut-off valve 34 is arranged upstream of each tube 15 in the flow direction, in the feed line 6.

In order to be able to increase a tube internal pressure in a tube 15 or in two or more tubes 15, independently in particular of the other tubes 15, a further shut-off valve 35 is disposed downstream of each tube 15 in each case, in the flow direction of the suspension 4. By shutting off a valve 35, it is possible to prevent the suspension exiting from the tube 15 via the drain line 7 extending within the receiving space 9. The suspension 4 is therefore able to emerge via the pores in a tube wall into the receiving space 9. Because the tube 15 is preferably of stretchable design, an enlargement of the pores in the tube wall can be achieved by raising the pressure within the tube 15. The bioreactor 3 comprises a further drain line 7, via which suspension 4 can be discharged from the receiving space 9 in the event of the first drain line 7 being shut off.

The aeration device 8 comprises an aeration plate 19 disposed on a base 18 of the reaction vessel 5 of the bioreactor 1, 2, 3. The aeration plate 19 is connected to the compressor 17 via a gas supply line 16, more particularly the main gas line 26. The aeration plate 19 has a plurality of uniformly distributed aeration openings 20, via which oxygen can flow into the suspension 4.

The bioreactor 1, 2, 3 comprises in each case a pumping apparatus 21, which may be designed in particular as a centrifugal pump or circulating pump. By means of the pumping apparatus 21 it is possible to pump the suspension 4 through the feed line 6 into the reaction vessel 5 and to draw it off from the reaction vessel 5 via the drain line 7.

The bioreactor 1, 2, 3 therefore comprises a suspension circuit 29, which consists of the feed lines 6, the drain lines 7 and the reaction vessel 5, and in which the suspension 4 can be circulated by means of the pumping apparatus 21. The pumping apparatus 21 is configured such that it is possible to reverse a suspension flow direction within the reaction vessel 5 and/or within the lines of the bioreactor 1, 2, 3. In combination with a plurality of shut-off valves 30, 31, 34, 35, it is possible to adjust and vary the flow direction within the reaction vessel 5.

Branching off from the feed line 6, as shown in FIGS. 1 to 3, there may be, for example, a bypass feed line 32, which opens into the receiving space 9 of the reaction vessel 5. If the suspension flow direction is reversed, a feed line 6 of the plurality of feed lines 6 may change function to become a drain line 7, and/or the bypass feed line 32 may change function to become a drain line 7. The function of the respective line is therefore dependent on the flow direction of the suspension 4, which is dictated by the pumping apparatus 21. Generally, however, it may be stated that feed lines 6 open into the receiving space 9 of the reaction vessel 5 above or at least at the same height as the drain lines 7. In this way it is possible to achieve better circulation of the suspension within the reaction vessel 5.

In order to be able to take the carrier element 10 out of the receiving space 9 easily, the bioreactor 1, 2, 3 comprises an opening 23 on a top side of the reaction vessel 5. By means of a closure unit 24 in the form of a lid, this opening 23 can be closed in a manner impervious to fluid and/or resistant to pressure, while the bioreactor 1, 2, 3 is in use.

In the upper third of the receiving space 9, the bioreactor 1 has a divider unit 36, via which the suspension 4 can be divided into a plurality of individual jets. This makes it possible on the one hand to divide up solids that are adhering to one another, and on the other hand to achieve additional aeration of the suspension. The divider unit 36 may be designed, for example, as a divider plate. Furthermore, this divider unit 36 may also be combined in the case of the other variant embodiments of FIGS. 2 and 3, or with the features from the claims.

The bioreactor 1, 2, 3 additionally comprises a heating apparatus 22, which allows the receiving space 9 and/or the suspension 4 contained therein to be heated to a desired temperature.

As can be seen in FIG. 3, it is possible for a shut-off valve 33 to be disposed in the bypass gas line 25. In this way the introduction of oxygen into the receiving space 9 of the reaction vessel 5 can be prevented, while at the same time, however, aeration via the aeration plate 19 can take place.

In order to generate a biofilm 12 of at least partly ammonifying and/or nitrifying bacteria, a suspension with water is produced from a particulate organic seeding material. Serving as the seeding material here may be a worm excrement or worm earth, for example. Other possible seeding materials have already been described comprehensively above. Fundamentally it may be stated that the seed material suitably comprises, in principle, all organic substances which contain proteolytic soil bacteria.

For optimal biofilm formation, the seed material is contacted with the carrier material 10 by circulation and fluidization by means of blown-in air. The organic seed material has a heightened concentration of soil bacteria, mucilage and other proteins, and also of inorganic minerals, which carry dead bacterial material. These ingredients firstly support the adhesion of the bacteria that are present on the carrier element 10, and hence support biofilm formation. Furthermore, they also serve as nutrients for the bacteria. The result is a carrier element 10 having a diverse bacterial culture, which can be modified and altered in terms of quality and quantity and which consists of a multiplicity of soil bacteria including ammonifying and nitrifying bacteria.

After formation of the biofilm 12 on the carrier element 10, the carrier material 10 may be taken from a first reaction vessel 5 and transferred to a further reaction vessel 5. Conversion of an organic residual and/or waste material into an organic nutrient solution can then be performed using the biofilm. It is also conceivable, however, for the seeding step and the incubating step to be carried out in the same reaction vessel 5. In that case it is advisable to remove the seed material from the reaction vessel 5 before adding the organic residual and/or waste material.

The invention thus relates in particular to a bioreactor 1, 2, 3 and the use thereof for converting organic residual and/or waste materials into an organic nutrient solution with a fraction of at least 10% of plant-available mineralized nitrogen, based on the total nitrogen content of the nutrient solution, having a reaction vessel 5, where the reaction vessel 5 comprises a feed line 6 via which a suspension 4 can be introduced into the reaction vessel 5, and where the reaction vessel 5 comprises a drain line 7 via which the suspension 4 can be discharged from the reaction vessel 5, and having an aeration device 8 for aerating the suspension 4 and/or a carrier element 10 disposed within the reaction vessel 5, where the carrier element 10 has at least one inner and one outer colonization surface 11, on each of which ammonifying and/or nitrifying bacteria can colonize in a biofilm 12.

Figure 4:
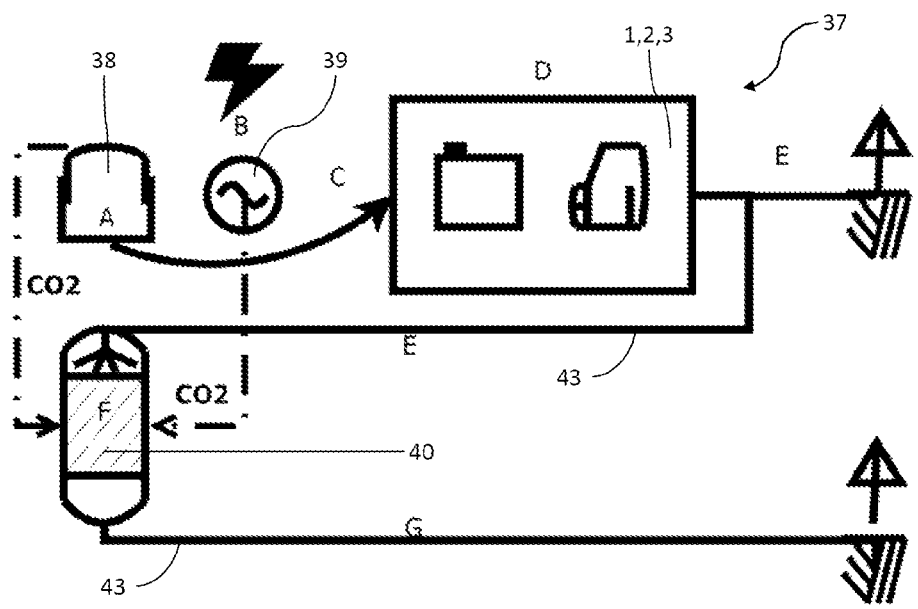
FIG. 4 shows a simplified representation of an overall-system overview of a variant embodiment of a nutrient generation and carbon dioxide storage system.

FIG. 4 shows a nutrient generation and carbon dioxide storage system 37, which comprises a fermentation apparatus 38 for generating biogas and an organic residual and/or waste material, a combined heat and power plant 39 for burning a biogas, generated by the fermentation apparatus 38, to obtain electrical energy and/or heat, a bioreactor 1, 2, 3 for converting organic residual and/or waste materials into an organic nutrient solution, and a carbon dioxide storage apparatus 40 having a carbon dioxide storage space 41, preferably an externally sealable carbon dioxide storage space 41, in which at least one scrubber device 42 is disposed, which is configured to implement a liquid-gas reaction between a carbon dioxide-containing gas, more particularly a biogas and/or a flue gas from a combined heat and power plant 39, and the organic nutrient solution produced by the bioreactor 1, 2, 3.

Carbon dioxide formed by the fermentation process in the fermentation apparatus 38 can be passed into the carbon dioxide storage apparatus 40 via a line 43 in the form of a gas line. The organic residual and waste material (fermentation residue) is passed into the bioreactor 1, 2, 3 from the fermentation apparatus 38 as a starting material for the production of the organic nutrient solution. Biogas produced in the fermentation apparatus 38 can be burned by means of the combined heat and power plant 39. Carbon dioxide formed in that process is likewise passed into the carbon dioxide storage apparatus 40.

The organic nutrient solution produced in the bioreactor 1, 2, 3 from the residual and waste material (fermentation residue) is subsequently conveyed from the bioreactor 1, 2, 3 via a line 43 into the carbon dioxide storage space 41. There it is mixed with the carbon dioxide-containing gas from the fermentation apparatus 38 and the combined heat and power plant 39.

Figure 5:
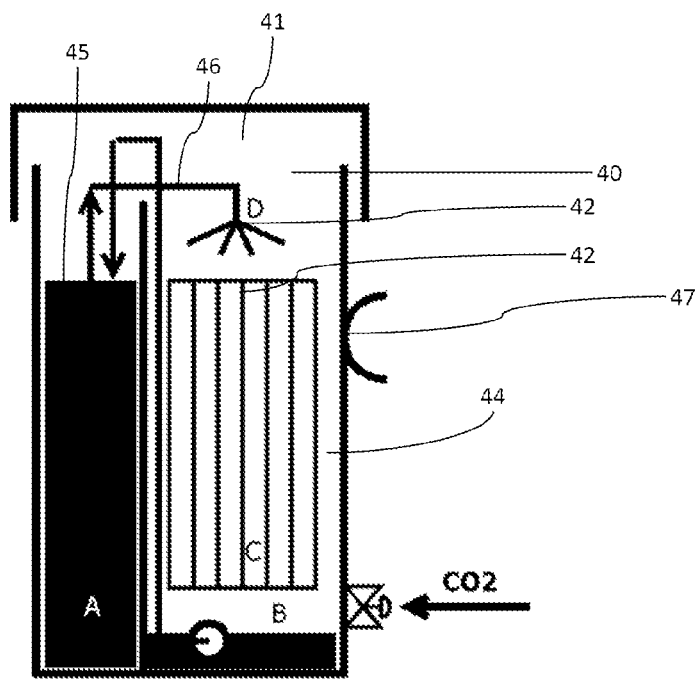
FIG. 5 shows a simplified representation of one possible variant embodiment of a carbon dioxide storage apparatus with two chambers.

FIG. 5 shows the process of $CO_2$ storage by the organic nutrient solution in the carbon dioxide storage apparatus 40.

The carbon dioxide storage space 41 of the carbon dioxide storage apparatus 40 is subdivided into two chambers 44, 45. By means of the pumping apparatus 46, the organic nutrient solution can be pumped back and forth between the chambers 44, 45. In the first chamber 44 there is a scrubber device 42. This may take the form, for example, of a bubble column reactor, tubular reactor, jet nozzle reactor, stirred tank, thin-film reactor and/or spraying tower. Critical to improved $CO_2$ binding is the production of as large as possible an interface between the organic nutrient solution and the gas.

Figure 6:
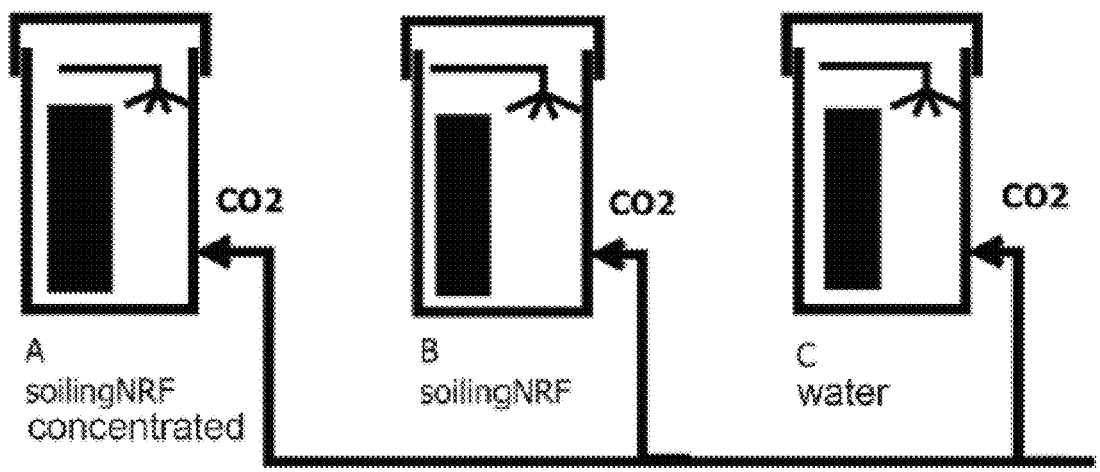
FIG. 6 shows an experimental construction of a plurality of carbon dioxide storage apparatuses which are connected in parallel and which contain A) concentrated nutrient solution, B) nutrient solution or C) water as reference, as absorbents for $CO_2$ storage.
Figure 7:
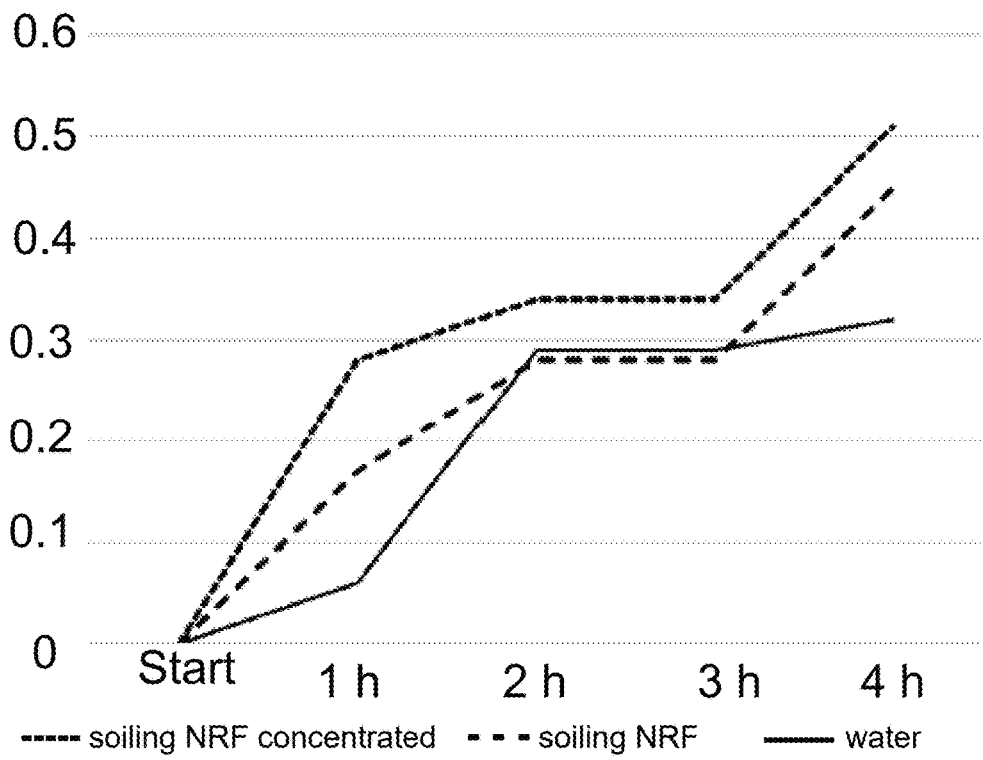
FIG. 7 shows the result of the experiment shown in FIG. 6, with A) concentrated nutrient solution shown with the narrow-dashed graph, B) nutrient solution shown with the wide-dashed graph, and C) water shown as a solid line.

The carbon dioxide storage apparatuses 40 in FIG. 6 are all designed the same, in order to create uniform experimental conditions. As can be seen from FIG. 7, given the same treatment time, the result with the concentrated nutrient solution is the best. This allows the most $CO_2$/liquid volume to be bound.

The composition of the samples A (concentrated nutrient solution), B (nutrient solution) and C (reference=water) is as follows:

| Scrubber A |
| --- |
| Absorbent: soilingNRF concentrated<br>Gas volume in l: 82<br>Liquid quantity in circulation in l: 2.93<br>Gas/liquid volume coefficient: 28<br>Temperature of liquid 25 degrees C. |

| pH | NH4 mg/l * | NO3 mg/l * | Ca CO3 mg/l * | K mg/l * |
| --- | --- | --- | --- | --- |
| 8.3 | 80 | 1750 | 70 | 3750 |

* Measured with test strips from MerckKGA, Darmstadt; MQuant. The concentration is determined by visual comparison of the reaction zone on the test strip with the fields of a color scale

| Scrubber B |
| --- |
| Absorbent: soilingNRF<br>Gas volume in l: 56<br>Liquid quantity in circulation in l: 53<br>Gas/liquid volume coefficient: 1.05<br>Temperature of liquid: 25 degrees C. |

| pH | NH4 mg/l* | NO3 mg/l* | Ca CO3 mg/l* | K mg/l* |
| --- | --- | --- | --- | --- |
| 5.7 | 8 | 450 | 90 | 375 |

*Measured with test strips from MerckKGA, Darmstadt; MQuant. The concentration is determined by visual comparison of the reaction zone on the test strip with the fields of a color scale

| Scrubber C |
| --- |
| Absorbent: water<br>Gas volume in l: 56<br>Liquid quantity in circulation in l: 49<br>Gas/liquid volume coefficient: 1.14<br>Temperature of liquid 25 degrees C. |

| pH | NH4 mg/l* | NO3 mg/l* | Ca CO3 mg/l* | K mg/l* |
| --- | --- | --- | --- | --- |
| 6.3 | 0 | 3 | 80 | 0 |

*Measured with test strips from MerckKGA, Darmstadt; MQuant. The concentration is determined by visual comparison of the reaction zone on the test strip with the fields of a color scale The gas mixture from the exhaust gases of a combustion engine is fed to the carbon dioxide storage apparatus A, B and C for around 10 minutes and then the access ports are provided with gas-tight sealing. The $CO_2$ content is measured at the start of the scrubber function and then after hours 1, 2, 3 and 4. The measuring instrument (testo 330-2 LX; flue gas analyzer from Testo SE and Co KGaA, Lenzkirch) determines the fraction of $CO_2$ in the gas mixture.

The result of the experiment may be gathered from the table below and from the associated diagram from FIG. 7.

Result of experiment:

| | | Start | 1 h | 2 h | 3 h | 4 h |
| --- | --- | --- | --- | --- | --- | --- |
| soiling<br>NRF<br>concentrated<br>A | CO2 in % | 1.13 | 0.85 | 0.79 | 0.79 | 0.62 |
| | Loading of the liquid | 0 | 0.28 | 0.34 | 0.34 | 0.51 |
| | Loading weighted by gas/liquid coefficient | 0 | 7.8 | 9.5 | 9.5 | 14.3 |
| soiling<br>NRF<br>B | CO2 in % | 1.19 | 1.02 | 0.91 | 0.91 | 0.74 |
| | Loading of the liquid | 0 | 0.17 | 0.28 | 0.28 | 0.45 |
| | Loading weighted by gas/liquid coefficient | 0 | 0.2 | 0.3 | 0.3 | 0.5 |
| Water | CO2 in % | 1.08 | 1.02 | 0.79 | 0.79 | 0.76 |
| C | Loading of the liquid | 0 | 0.06 | 0.29 | 0.29 | 0.32 |
| | Loading weighted by gas/liquid coefficient | 0 | 0.1 | 0.3 | 0.3 | |

The $CO_2$ concentration at the start of the series of experiments was around 30 times higher than the $CO_2$ concentration of 0.038% in air.

After 4 hours of running, the absorbent liquids of scrubbers A, B and C are subjected to measurement, the resulting values being as follows:

| Scrubber A with soilingNRCO2capF concentrated |
| --- |

| pH | NH4 mg/l * | NO3 mg/l * | Ca CO3 mg/l * | K mg/l * |
| --- | --- | --- | --- | --- |
| 6.4 | 20 | 1750 | 200 | 125 |

* Measured with test strips from MerckKGA, Darmstadt; MQuant. The concentration is determined by visual comparison of the reaction zone on the test strip with the fields of a color scale

| Scrubber B with soilingNRCO2capF |
| --- |

| pH | NH4 mg/l * | NO3 mg/l * | Ca CO3 mg/l * | K mg/l * |
| --- | --- | --- | --- | --- |
| 5.3 | 5 | 450 | 120 | 170 |

* Measured with test strips from MerckKGA, Darmstadt; MQuant. The concentration is determined by visual comparison of the reaction zone on the test strip with the fields of a color scale

| Scrubber C with water |
| --- |

| pH | NH4 mg/l * | NO3 mg/l * | Ca CO3 mg/l * | K mg/l * |
| --- | --- | --- | --- | --- |
| 6 | 0 | 3 | 130 | 0 |

* Measured with test strips from MerckKGA, Darmstadt; MQuant. The concentration is determined by visual comparison of the reaction zone on the test strip with the fields of a color scale Particularly effective $CO_2$ storage was possible by means of the concentrated nutrient solution (A) and the nutrient solution (B).

The invention is also suitable for the binding and/or as an absorbent of COx, NOx and SOx from fermentation gases and combustion gases formed in biogas recovery and biogas combustion and also in the combustion of fossil fuels.

The system is therefore especially suitable for implementing the process, described and/or claimed herein, for the production of an organic nutrient solution and/or carbon dioxide storage.

LIST OF REFERENCE SYMBOLS

1, 2, 3 Bioreactor
4 Suspension
5 Reaction vessel
6 Feed line
7 Drain line
8 Aeration device
9 Receiving space
10 Carrier element
11 Colonization surface
12 Biofilm 13 Chips
14 Granules
15 Tube
16 Gas supply line
17 Compressor
18 Base of the reaction vessel
19 Aeration plate
20 Aeration openings
21 Pumping apparatus
22 Heating apparatus
23 Opening
24 Closure unit
25 Bypass gas line
26 Main gas line
27 Collecting unit
28 Further aeration device
29 Suspension circuit
30 Shut-off valve
31 Shut-off valve
32 Bypass feed line
33 Shut-off valve (air)
34 Shut-off valve in the reaction vessel
35 Shut-off valve in the reaction vessel
36 Divider unit
37 Nutrient generation and carbon dioxide storage system
38 Fermentation apparatus, more particularly a biogas plant
39 Combined heat and power plant
40 Carbon dioxide storage apparatus
41 Carbon dioxide storage space
42 Scrubber device
43 Line
44 Scrubber device chamber
45 Collecting chamber
46 Pumping apparatus
47 Carbon dioxide measuring device

What is claimed is:

1. A process for producing an organic nutrient solution with a fraction of at least 10% of plant-available, mineralized nitrogen, based on a total nitrogen content of the organic nutrient solution, the process comprising the steps of:
   in a seeding step, seeding a carrier element (10) with a seed material which comprises ammonifying and/or nitrifying bacteria,
   forming a biofilm (12) with at least one of ammonifying or nitrifying bacteria on the carrier element (10),
   in an incubating step, incubating at least one of an organic residual or an organic waste material with the biofilm (12), where the at least one of the ammonifying or the nitrifying bacteria convert organically bonded nitrogen in the at least one of the residual or waste material into mineralized nitrogen,
   where during implementation of at least one of the seeding of the carrier element (10), the forming of the biofilm (12), or the incubating of the at least one of the organic residual or the organic waste material with the biofilm (12), oxygen is introduced into at least one of a reaction vessel (5) or the carrier element (10) by an aerating device (8),
   producing an organic nutrient solution by the preceding steps, and subsequently, in a carbon dioxide storage step, treating the organic nutrient solution with a carbon dioxide-containing gas, such that gaseous carbon dioxide is bound by the organic nutrient solution.

2. The process as claimed in claim 1, further comprising performing a surface enlargement of the organic nutrient solution in the carbon dioxide storage step.

3. The process as claimed in claim 2, wherein the surface enlargement is performed by passing the organic nutrient solution over a scrubber device.

4. The process as claimed in claim 1, wherein a nitrate fraction of the plant-available, mineralized nitrogen is higher than an ammonium fraction.

5. The process as claimed in claim 1, wherein carrier element (10) includes a colonization surface (11) for formation of the biofilm (12).

* * * * *